350-174

CROSS REFERENCE

178

5.4

SEARCH ROOM

Oct. 31, 1961 F. SCHRÖTER 3,006,989

COLOR TELEVISION PICTURE REPRODUCER

Filed Feb. 7, 1958

X2546

INVENTOR:

Fritz Schröter

BY Erni D. Frankel

PATENT AGENT 3,006,989

COLOR TELEVISION PICTURE REPRODUCER

Fritz Schröter, Neu-Ulm, Danube, Germany, assignor to Telefunken G.m.b.H., Berlin, Germany Filed Feb. 7, 1958, Ser. No. 713,918
Claims priority, application Germany Feb. 16, 1957
3 Claims. (Cl. 178—5.4)

The present invention relates to a color television receiver and, more particularly, to a color television picture apparatus.

It is an object of the present invention to provide a color television apparatus in which the images of two or more mono-chromatic picture images are combined and projected from separate luminescent screens and superimposed on a common screen.

It is another object of the invention to provide within a common tube separate screens which are arranged adjacent one another perpendicular to the axis of the tube and are adapted to luminesce respectively in several component colors upon impingement of energizing rays.

It is a further object of the invention to provide means for reproducing separate color images on these screens in which each mono-chromatic image component thus obtained has a reduced height in proportion to its width. This width of the images may be the full length of a scanning line. Thus, each image is compressed in one dimension to produce an intentional distortion.

It is a still further object of the invention to provide a deflecting mirror system adapted to bring the separate color images optically into coincidence, so that their light paths from the screens to an optical projecting system are of equal length. The composite picture is projected by means of a system, such as an anamorphotic system, adapted to correct the aforementioned intentional distortion of the image shape, i.e., to restore the composite picture on the projection screen to the original proportions of its dimensions.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Figure 1:
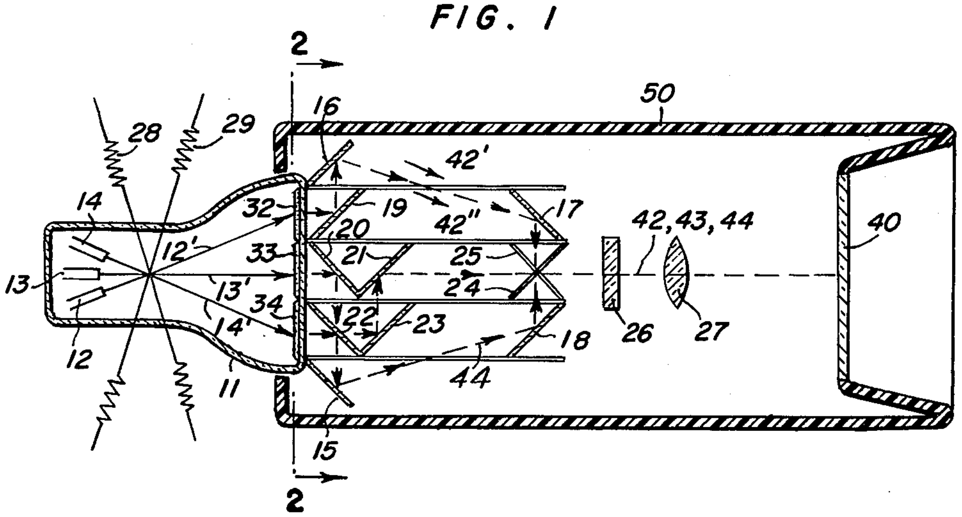

FIGURE 1 of the drawing shows schematically a longitudinal section through a three-color television picture apparatus according to the invention, wherein conventional components not directly related to the invention are omitted to avoid crowding.

Figure 2:
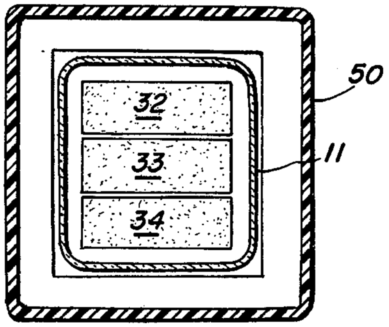

FIGURE 2 is a section along line 2—2 of FIGURE 1.

In the embodiment illustrated, an evelope 11 of the novel cathode ray picture tube contains a three-color reproducing system, although the invention is not limited to three-color systems. For example, two-color systems may suitably be provided and may have certain advantages. Three cathode ray electron guns 12, 13, 14 are provided in the envelope 11, said guns being adapted to emit cathode ray beams 12′, 13′ and 14′, respectively. These three cathode ray beams are produced and controlled independently with respect to their respective current intensities by an external receiver circuit (not shown). The individual control signals are varied in accordance with the separately-transmitted color-component signals. The three cathode ray beams 12′, 13′ and 14′ are deflected in the horizontal direction by a common deflection means 28, and these three cathode ray beams are also vertically deflected by a common deflection means 29. These deflection means may be electromagnetic or electrostatic and are schematically indicated in the drawing. Suitable common sweep circuits are employed for all three beams 12′, 13′, 14′ to assure a common vertical and a common horizontal geometric relationship between the three images produced by the three beams. In addition to this, common deflection means assures the desired superposition of the three scanned images. Three phosphor coated screens 32, 33 and 34 of equal height are mounted adjacent one another, substantially perpendicular with respect to the axis of the picture tube envelope. The raster scanning pattern on screen 32 may, for example, produce a luminescence in the primary color red, while the screens 33 and 34 produce images in the primary colors green and blue, respectively. Thus, three component images, each in a certain primary color, are simultaneously reproduced independently of one another on three separate screens.

It is apparent from the drawing that each of the three color screens has a height which is deliberately compressed to approximately ⅓ of the original height of the pictures, while their original width is retained (see FIGURE 2). Thus, the images on these screens are intentionally distorted, so that these three screens can be placed side-by-side on the face of a single picture area. Full picture detail is obtained along every scanned line in the conventional way, while the dot area on the screen, i.e., the electron spot of each of the three ray beams has to be very small in order to assure the vertical resolution necessary for a satisfactory picture. Such requirement is fulfilled in other known picture tubes in which the raster is composed of narrow stripe elements and the color mixing actually is perceived in the eye of the viewer by merging. These elements have to be extremely small, and the three area components forming one composite picture element have to be very carefully superimposed, i.e., beyond the resolution of the eye. Thus, highly focussed ray beams known per se in the television technique have to be used in the new system to provide an extremely small dot area.

The present apparatus comprises optical means adapted to recompose a single composite picture from the three separate color images and to correct the distortion during the projection on a final picture screen in such a manner, that the picture appears on the screen in its original proportions with respect to height and width. Anamorphotic distortion correcting systems, similar to those conventional in the moving picture technique, such as, for example, the distortion correcting system known in "Cinemascope," may be employed. The ratio of distortion correction in the present example is approximately 3:1. If this picture compressing ratio is too large, the three mono-chromatic color screen patterns have to be compressed to less than one-third of their ordinary height. A mirror system comprising plane mirrors 15, 16, 17, 18, 19, 20, 21, 22 and 23 is provided in order to bring the three-color components into optical superposition. The mirror 22 has a reflecting layer on both of its sides. Plane interference filters 24 and 25 are disposed in the paths of the light. Filter 24 is adapted to reflect blue, and permits green and red to pass, while the filter 25 reflects red, and permits green and blue to pass. Such filters have been known per se, see for example Patents 2,392,978 and 2,642,487, disclosing light dividers and color separators. One kind of interference filter commonly employed comprises a transparent dielectric having a thickness of an odd multiple of a greater wave length than the ratio which is to pass through the filter; said dielectric being covered on both sides with a very thin metal coating, see for example German Patent No. 716,153. Without limiting the scope of the invention, adjusted color separators of such type may be employed in the color picture tube according to the invention. Suitably, very high qualified filters having a high efficiency should be employed.

The optical projecting system adapted to correct distortion of the compressed pictures comprises a cylindrical lens 26, or a cylindrical lens system and a lens 27, for projecting the patterns of image screens 32, 33, 34 on a final picture screen 40. The lens system 26 and 27 is known in the optical art as an anamorphotic system. The cylinder axis of the system 26 is perpendicular with respect to the plane of the drawings.

The mirror system including the filters 24 and 25 operates as follows: The red light rays emitted from screen 32 follow path 42, indicated by dashed lines, from the component color scanning image. These light rays are reflected by the mirror 19 at an angle of 90° and again reflected by the mirror 16 which is inclined with respect to the mirror 19. The light rays coming from the mirror 16 impinge on the mirror 17 to be reflected toward the filter system 24, 25, from which these light rays are deflected toward the anamorphotic lens system 26, 27.

The dashed line 42 actually illustrates only the center light beam of the image on screen 32. An arrow 42′ indicates the light ray path of the upper part of the image on screen 32, while arrow 42″ indicates the light ray path in the lower part of this image. It will be understood that "upper part" and "lower part," as used herein, refer to upper and lower parts on the screen 32, while the actual picture projected by the projecting system 26 and 27 is inverted. Hence, the meaning of upper and lower parts shall always be related to the images, as they are reproduced on the screens 32, 33 and 34. Referring now to the image on screen 32 and following the light along arrow 42′, it can be seen that the red light rays, after having been reflected by the mirror 17, are reflected by the filter 25, because this filter 25 is adapted to reflect red light. The light rays reflected by the filter 25 pass through the upper part of the filter 24, because this filter 24 is adapted to permit passage of red light. The light rays following the path of the arrow 42″ and belonging to the lower part of the image on the screen 32 are reflected by the mirror 17. These rays, after passing through filter 25, are reflected by the filter 24. Consequently, the light rays from the upper part of the image on the screen 32 are reflected first by the filter 25 and, thereafter, pass through the filter 24, while the light rays from the lower part of the image on the screen 32 pass first through the filter 24 and are then reflected by the filter 25.

The green light rays from the screen 33, following the dashed line 43 in the direction of the arrows, are reflected in the following order: by the mirror 20, the upper reflecting layer of the mirror 22, the mirror 23 and the mirror 21. Since both of the filters 24 and 25 are adapted to permit passage of green light rays, the light rays from screen 33, following the line 43, remain undeflected by both filters 24 and 25.

The blue light rays from the screen 34 are reflected by the following mirrors: lower reflecting layer of the mirror 22, the mirror 15 and the mirror 18. As mentioned in the foregoing, the image on the screen 34 causes the emission of blue light rays and these light rays are influenced by the filters 24 and 25, this influence being inverse with respect to the above explained influence of the same filters upon the red picture.

The blue light rays from the upper part of the screen 34 pass first through the filter 25 and, thereafter, are reflected by the filter 24, while the blue light rays from the lower part of the screen 34 are reflected first by the filter 24, and then pass through the filter 25. It will be understood from this explanation that a recomposite three-color picture appears at the filter system 24, 25.

The green light rays from the screen 33 follow a by-pass, i.e., none of the mirrors 20 and 21 is used for deflecting the blue and red pictures. However, this by-pass is necessary to render the light paths of equal length for the three pictures. The suitably selected tilting angles of the mirrors 16, 17 and 15, 18, respectively, serve also for adjusting the light paths. Such provision is necessary, because the paths of light rays from the three screens 32, 33, 34 to the optical system 26 and 27 have to be of equal length, since the system 26, 27 serves to correct the distortion as well as to project the final picture on the screen 40. Obviously, the degree of resolution has to be equal in the three projected images and, therefore, the three light paths have to be of equal length. Screen 40 may not have a fluorescent layer, i.e., may be made of ordinary ground glass. As has been mentioned above, the deflection of all three cathode ray beams 12′, 13′, 14′ is common and if the electron-optical design of the tube is of high quality, the scanning lines of all three pictures will coincide in the composite projected picture. High quality in electronic optics requires long paths for the cathode rays, sharp focus, faultless deflection system and the employment of trimmers for the deflection means.

A certain loss of light has to be taken into account in view of the plurality of mirror reflections of the light rays. The loss of the green colored image component is the highest, because it is reflected once more than the red image and the blue image components. However, green has the highest intensity anyhow and so this additional loss is not too serious. In addition, the system as described operates by the composition of three separate image components, whereby their brightness add to one another. Thus, the total loss of all the mirror reflections is reasonably compensated by this brightness summation. The correction of distortion by means of a proper optical system for restoring the dimensions to those of an ordinary picture, for example, to the common twenty-one inch picture, assures that the contrast of the picture and its light intensity have a satisfactory relationship. Also, it is important to select a projection screen having an optimum focussing pattern for the images, in order to obtain good superposition. It is also advantageous to place the mirror system and the projecting system within a housing 50 having black inner walls to exclude interfering external light rays and to protect the optical system. The housing 50 may have the shape of a tube, having a larger cross section at the end which is closer to the viewer. While in the embodiment shown in the drawing, a three-color system is illustrated, the invention is not limited thereto, i.e., in addition to two-color systems, any multicolor systems may be provided according to the teachings of the present invention.

I claim:

1. A color television picture reproducer, said reproducer having an axis and comprising at least two image screens each luminescing with a different component color and said screens being arranged side-by-side in a plane perpendicular to said axis; cathode ray guns in said reproducer axially spaced from said screens and each directed to an associated image screen to emit a beam impinging on the associated screen; sweep means moving said beams for simultaneously sweeping said screens in distorted vertical-to-horizontal line ratio, whereby the images are vertically compressed on the adjacent image screens; mirror means translating the light beams from the screens from parallel mutual relation to superimposed relation, the light ray paths from the respective image screens through the mirror means being of substantially the same lengths; and an anamorphotic projection system for restoring to the composite image the original vertical-to-horizontal line ratios and casting the composite picture on a projection screen.

2. A reproducer according to claim 1, wherein the beams from all of the electron guns are subjected to the deflection of a common vertical and a common horizontal sweep means.

3. A reproducer according to claim 1, wherein three color image screens are arranged side-by-side, the vertical sweep being compressed by a factor of about 3:1 as compared with the normal image ratios, and the horizontal sweep components being parallel and coextensive.

References Cited in the file of this patent

UNITED STATES PATENTS

| | | |
|---|---|---|
| 1,722,356 | Romer | July 30, 1929 |
| 1,945,029 | Daponte | Jan. 30, 1934 |
| 2,200,285 | Lorenzen | May 14, 1940 |
| 2,337,980 | Du Mont et al. | Dec. 28, 1943 |
| 2,587,074 | Sziklai | Feb. 26, 1952 |
| 2,747,460 | Calvi | May 29, 1956 |
| 2,797,257 | Law | June 25, 1957 |
| 2,803,698 | De Vrijer | Aug. 20, 1957 |
| 2,855,457 | Loughren | Oct. 7, 1958 |

FOREIGN PATENTS

| | | |
|---|---|---|
| 76,037 | Netherlands | Oct. 15, 1954 |
| 206,705 | Australia | Oct. 13, 1955 |